(12) United States Patent
Ormazabal et al.

(10) Patent No.: US 9,374,342 B2
(45) Date of Patent: Jun. 21, 2016

(54) SYSTEM AND METHOD FOR TESTING NETWORK FIREWALL USING FINE GRANULARITY MEASUREMENTS

(75) Inventors: Gaston S. Ormazabal, New York, NY (US); Henning G. Schulzrinne, Leonia, NJ (US); Eilon Yardeni, Brooklyn, NY (US); Kundan Singh, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1990 days.

(21) Appl. No.: 11/557,751

(22) Filed: Nov. 8, 2006

(65) Prior Publication Data

US 2007/0124813 A1    May 31, 2007

Related U.S. Application Data

(60) Provisional application No. 60/734,318, filed on Nov. 8, 2005.

(51) Int. Cl.
  *G06F 15/16* (2006.01)
  *H04L 29/06* (2006.01)
  *H04L 12/26* (2006.01)

(52) U.S. Cl.
  CPC .......... *H04L 63/029* (2013.01); *H04L 12/2697* (2013.01); *H04L 29/06027* (2013.01); *H04L 29/06625* (2013.01); *H04L 43/50* (2013.01); *H04L 65/1006* (2013.01)

(58) Field of Classification Search
  CPC ............ H04L 65/1003; H04L 65/1006; H04L 63/029; H04L 29/06625; H04L 43/50

USPC .................................................. 709/223–224
See application file for complete search history.

(56) References Cited

U.S. PATENT DOCUMENTS

| | | | |
|---|---|---|---|
| 5,414,704 A |  | 5/1995 | Spinney |
| 5,465,286 A |  | 11/1995 | Clare et al. |
| 5,473,607 A |  | 12/1995 | Hausman et al. |
| 5,828,653 A |  | 10/1998 | Goss |
| 5,859,980 A | * | 1/1999 | Kalkunte .................. 709/232 |
| 5,909,686 A |  | 6/1999 | Muller et al. |
| 5,936,962 A |  | 8/1999 | Haddock et al. |
| 5,991,270 A |  | 11/1999 | Zwan et al. |
| 6,154,775 A |  | 11/2000 | Coss et al. |

(Continued)

OTHER PUBLICATIONS

Rosenberg, et al., "SIP: Session Initiation Protocol", Internet Engineering Task Force, Request for Comments 3261, Jun. 2002.

(Continued)

*Primary Examiner* — Linglan Edwards

(57) ABSTRACT

A device may verify whether pinholes in a perimeter protection device are open and may determine pinhole opening and closing delays. The method for determining the pinhole opening delay may include sending a stream of packets for passing through the pinhole in the network perimeter protection device. The packets in the stream may be sent at known time intervals. The method may include receiving one or more of the packets in the stream, wherein the received packets passed through the pinhole. The pinhole opening delay may be based on an indication of the position of the first one of the packets received in the stream and the known time intervals. The pinhole closing delay may be based on the number of packets having passed through the pinhole, after sending a session termination message, and the known time intervals.

26 Claims, 9 Drawing Sheets

(56) References Cited

U.S. PATENT DOCUMENTS

| | | | |
|---|---|---|---|
| 6,175,902 B1 | 1/2001 | Runaldue et al. | |
| 6,680,089 B2 | 1/2004 | Miyake et al. | |
| 6,701,346 B1 | 3/2004 | Klein | |
| 6,707,817 B1 * | 3/2004 | Kadambi et al. | 370/390 |
| 6,816,910 B1 | 11/2004 | Ricciulli | |
| 6,826,616 B2 | 11/2004 | Larson et al. | |
| 6,880,089 B1 | 4/2005 | Bommareddy et al. | |
| 6,920,107 B1 | 7/2005 | Qureshi et al. | |
| 6,930,598 B2 | 8/2005 | Weiss | |
| 6,934,756 B2 | 8/2005 | Maes | |
| 7,007,299 B2 | 2/2006 | Ioele et al. | |
| 7,072,291 B1 * | 7/2006 | Jagadeesan et al. | 370/216 |
| 7,076,393 B2 | 7/2006 | Ormazabal et al. | |
| 7,254,832 B1 | 8/2007 | Christie | |
| 7,340,166 B1 | 3/2008 | Sylvester et al. | |
| 7,385,927 B2 | 6/2008 | Gygi et al. | |
| 7,385,931 B2 | 6/2008 | Magnaghi et al. | |
| 7,421,734 B2 | 9/2008 | Ormazabal et al. | |
| 7,440,573 B2 | 10/2008 | Lor et al. | |
| 7,499,405 B2 | 3/2009 | Gilfix et al. | |
| 7,634,249 B2 | 12/2009 | Hahn et al. | |
| 7,653,938 B1 | 1/2010 | Touitou et al. | |
| 7,672,336 B2 | 3/2010 | Bharrat et al. | |
| 7,716,725 B2 | 5/2010 | Xie | |
| 7,721,091 B2 | 5/2010 | Iyengar et al. | |
| 8,027,251 B2 | 9/2011 | Ormazabal et al. | |
| 2002/0083187 A1 | 6/2002 | Sim et al. | |
| 2002/0112073 A1 | 8/2002 | Melampy et al. | |
| 2002/0156903 A1 | 10/2002 | Bach Corneliussen | |
| 2003/0009561 A1 | 1/2003 | Sollee | |
| 2003/0055931 A1 | 3/2003 | Cravo De Almeida et al. | |
| 2003/0076780 A1 | 4/2003 | Loge et al. | |
| 2003/0086425 A1 | 5/2003 | Bearden et al. | |
| 2003/0093562 A1 | 5/2003 | Padala | |
| 2003/0093563 A1 | 5/2003 | Young et al. | |
| 2003/0115321 A1 * | 6/2003 | Edmison et al. | 709/224 |
| 2003/0117961 A1 | 6/2003 | Chuah et al. | |
| 2003/0120816 A1 | 6/2003 | Berthaud et al. | |
| 2003/0126464 A1 | 7/2003 | McDaniel et al. | |
| 2003/0135639 A1 | 7/2003 | Marejka et al. | |
| 2003/0165136 A1 | 9/2003 | Cornelius et al. | |
| 2003/0195861 A1 | 10/2003 | McClure et al. | |
| 2004/0001443 A1 | 1/2004 | Soon et al. | |
| 2004/0013086 A1 * | 1/2004 | Simon et al. | 370/230 |
| 2004/0015579 A1 | 1/2004 | Cooper et al. | |
| 2004/0028035 A1 | 2/2004 | Read | |
| 2004/0034793 A1 | 2/2004 | Yuan | |
| 2004/0039938 A1 | 2/2004 | Katz et al. | |
| 2004/0068668 A1 | 4/2004 | Lor et al. | |
| 2004/0128554 A1 | 7/2004 | Maher et al. | |
| 2004/0133772 A1 | 7/2004 | Render | |
| 2004/0136379 A1 | 7/2004 | Liao et al. | |
| 2004/0208186 A1 | 10/2004 | Eichen et al. | |
| 2004/0236966 A1 | 11/2004 | D'Souza et al. | |
| 2004/0244058 A1 | 12/2004 | Carlucci et al. | |
| 2004/0255156 A1 | 12/2004 | Chan et al. | |
| 2005/0018618 A1 | 1/2005 | Mualem et al. | |
| 2005/0050377 A1 | 3/2005 | Chan et al. | |
| 2005/0076235 A1 * | 4/2005 | Ormazabal et al. | 713/201 |
| 2005/0165917 A1 | 7/2005 | Le et al. | |
| 2005/0201320 A1 | 9/2005 | Kiss et al. | |
| 2005/0201357 A1 | 9/2005 | Poyhonen | |
| 2005/0232229 A1 | 10/2005 | Miyamoto et al. | |
| 2006/0007868 A1 | 1/2006 | Shinomiya | |
| 2006/0013192 A1 | 1/2006 | Le et al. | |
| 2006/0075084 A1 | 4/2006 | Lyon | |
| 2006/0075132 A1 | 4/2006 | Liu | |
| 2006/0077981 A1 * | 4/2006 | Rogers | 370/395.21 |
| 2006/0146792 A1 | 7/2006 | Ramachandran et al. | |
| 2006/0165060 A1 | 7/2006 | Dua | |
| 2006/0227766 A1 * | 10/2006 | Mickle et al. | 370/356 |
| 2007/0022479 A1 | 1/2007 | Sikdar et al. | |
| 2007/0110053 A1 | 5/2007 | Soni et al. | |
| 2007/0118894 A1 | 5/2007 | Bhatia | |
| 2007/0121596 A1 | 5/2007 | Kurapati et al. | |
| 2007/0192863 A1 | 8/2007 | Kapoor et al. | |
| 2008/0037447 A1 | 2/2008 | Garg et al. | |
| 2008/0040801 A1 | 2/2008 | Buriano et al. | |

OTHER PUBLICATIONS

Kuthan, et al., "Middlebox Communication: Framework and Requirements-Internet Draft," Internet Engineering Task Force (IETF), http://tools.ietf.org/html/draft-kuthan-midcom-framework-00, 26 pages, Nov. 2000.

Sisalem, et al., "Denial of Service Attacks Targeting a SIP VoIP Infrastructure: Attack Scenarios and Prevention Mechanisms", IEEE Network, vol. 20, Issue: 5, Publication Year: Sep./Oct. 2006, pp. 26-31.

* cited by examiner

SYSTEM AND METHOD FOR TESTING NETWORK FIREWALL USING FINE GRANULARITY MEASUREMENTS

RELATED APPLICATION

This application claims priority under 35 U.S.C. §119 based on U.S. Provisional Patent Application No. 60/734,318, filed Nov. 8, 2005, the disclosure of which is incorporated by reference herein in its entirety.

BACKGROUND INFORMATION

Session Initiation Protocol (SIP) is an application-layer control (i.e., signaling) protocol for creating, modifying, and terminating sessions with one or more participants. These sessions may include Internet-based telephone calls, multimedia distribution, multimedia conferences, instant messaging conferences, interactive voice response (IVR), automated and manual operator services, automatic call distribution, call routing, etc. SIP invitations or INVITES may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Networks implementing Voice over Internet Protocol (VoIP) may use network perimeter protection devices, such as firewalls, to block unwanted and/or potentially malicious traffic from infiltrating the network. Typical network perimeter protection devices fail to cope with the complexity of VoIP protocols at carrier-class performance.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and methods described herein may test, analyze, and validate a large scale SIP-aware application layer network perimeter protection device (e.g., a firewall). For example, the systems and methods may verify that the SIP-aware firewall rule sets are properly filtering traffic based on source and destination IP addresses, port numbers, and/or protocol being used. Thus, the SIP-aware firewall may be closed to all ports except those ports allowed by signaling.

The systems and methods may also use finer granularity measurements of pinhole (i.e., a port that is opened through a firewall to allow a particular application to gain controlled access to the protected network) opening and closing delays of the SIP-aware firewall. This may entail quantification of vulnerabilities of the SIP-aware firewall through statistical measurements as pinholes are opened and closed. The systems and methods may further generate VoIP load traffic for the SIP-aware firewall to test and analyze performance of the SIP-aware firewall under load conditions.

The systems and methods described herein may address potential security vulnerabilities of the SIP-aware firewall. For example, the systems and methods may calculate an excessive delay of the SIP-aware firewall in opening pinholes which may result in unintentional Denial of Service (DoS); may calculate an excessive delay of the SIP-aware firewall in closing pinholes which may create a closing delay window of vulnerability; may measure a length of various windows of vulnerability of the SIP-aware firewall; may provide a threshold for a window of vulnerability of the SIP-aware firewall to trigger an alert when the window of vulnerability exceeds a predetermined value; may determine incorrectly allocated pinholes by the SIP-aware firewall, which may result in DoS; may determine if extraneous pinholes/IP address combinations are opened through the SIP-aware firewall (which may increase the firewall's vulnerability through unrecognized backdoors); may determine an inability of the SIP-aware firewall to correlate call-state information with dynamically established rules in the SIP-aware firewall; etc.

Figure 1:
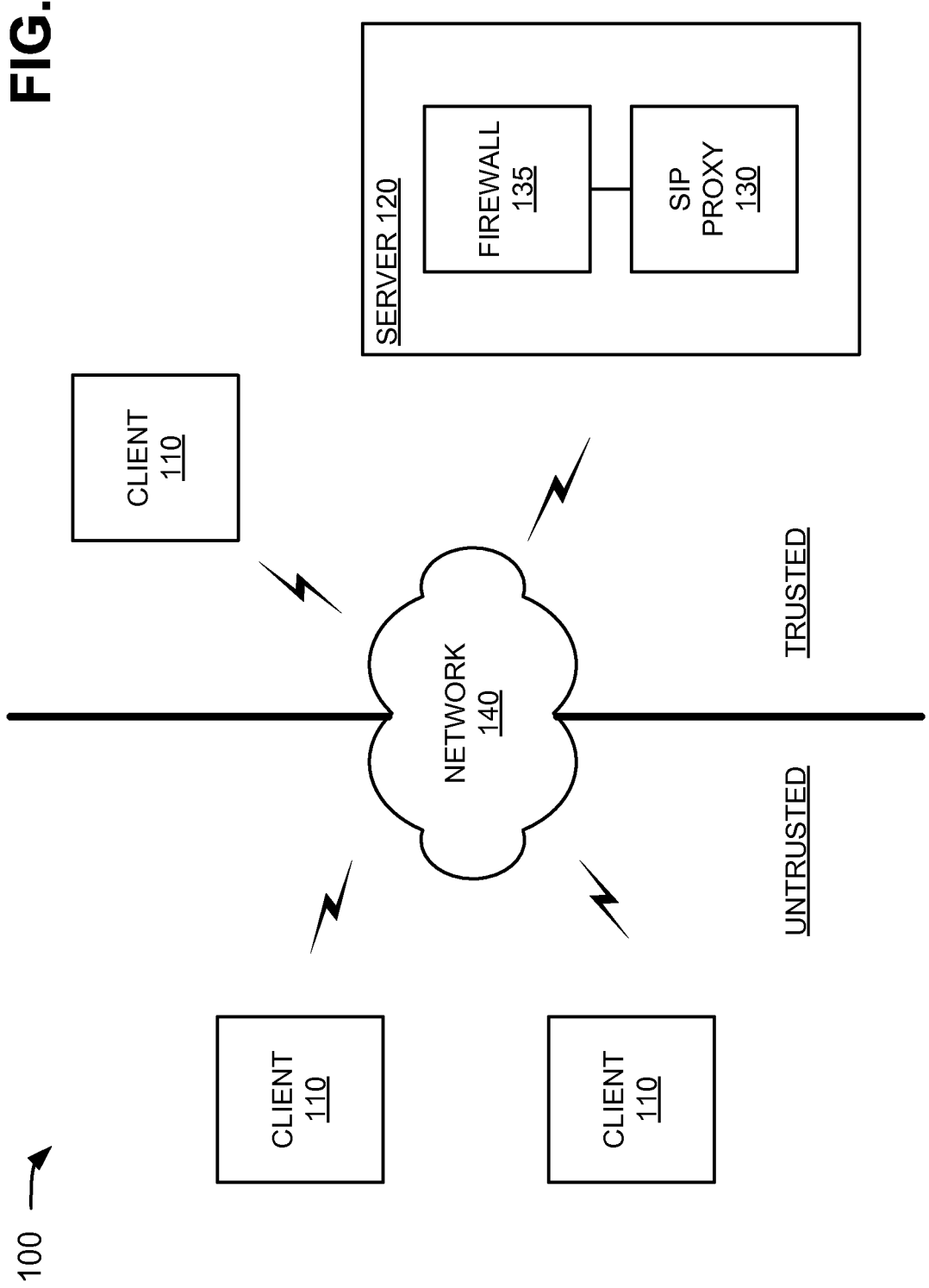
FIG. 1 depicts an exemplary network in which systems and methods described herein may be implemented.

FIG. 1 depicts an exemplary network 100 in which systems and methods described herein may be implemented. Network 100 may include multiple clients 110 connected to multiple servers (e.g., a server 120) via a network 140. Two clients 110 and one server 120 have been illustrated as connected to network 140 for simplicity. In practice, there may be more or fewer clients and servers. Also, in some instances, a client may perform one or more functions of a server and/or a server may perform one or more functions of a client.

Network 140 may include a local area network (LAN), a wide area network (WAN), a telephone network, such as the Public Switched Telephone Network (PSTN), an intranet, the Internet, a SIP-based network, a VoIP-based network, an IVR-based network, or a combination of networks. Clients 110 and server 120 may connect to network 140 via wired, wireless, and/or optical connections.

Clients 110 may include client entities. An entity may be defined as a device, such as a personal computer, a SIP telephone, a wireless telephone, a personal digital assistant (PDA), a lap top, or another type of computation or communication device, a thread or process running on one of these devices, and/or an object executable by one of these devices.

Server 120, also commonly referred to as a network server, may include a device that facilitates the establishment of SIP calls, or a device that is capable of facilitating SIP-based communications, e.g., Internet-based telephone calls, multimedia distribution, multimedia conferences, instant messaging conferences, IVR, VoIP, automated and manual operator services, automatic call distribution, call routing, etc.

Server 120 may include a server entity that gathers, processes, searches, and/or maintains applications (e.g., a high-speed, high-capacity packet processing applications server). As further shown in FIG. 1, server 120 may include a SIP proxy 130 and a firewall 135. SIP proxy 130 may include a device that facilitates the establishment of SIP calls. As described in the Internet Engineering Task Force (IETF) document RFC 2543, server 120 may act as both a server and a client for the purpose of making requests on behalf of other clients. Requests may be serviced internally or by passing them on, possibly after translation, to other servers. Server 120 may interpret, and, if necessary, rewrite a request message before forwarding it.

Firewall 135 may include a device which may be configured to permit, deny, and/or proxy data connections set and configured to prevent unwanted and/or potentially malicious traffic from infiltrating network 100. Firewall 135 may be hardware and/or software based. A basic task of firewall 135 may be to control traffic between devices (e.g., clients 110) of network 140 with different zones of trust. For example, as shown in FIG. 1, two clients 110 (to the left in FIG. 1) may reside in an untrusted or not trusted zone (e.g. the Internet), whereas client 110 (to the right in FIG. 1) and server 120 may reside in a trusted zone (e.g., an internal network). Firewall 135 may provide a controlled interface between zones of differing trust levels through the enforcement of a security policy and connectivity model based on the least privilege principle and separation of duties. In one implementation, firewall 135 may operate on data on behalf of an organizational network (e.g., a private network) and may prevent unwanted and/or potentially malicious traffic from untrusted sources. For example, firewall 135 may receive all, or substantially all, data destined for server 120 or trusted client 110 and/or transmitted by server 120 or trusted client 110.

The systems and methods described herein may utilize a deep-packet inspection filtering device (e.g., firewall 135), which may be deployed at the network perimeter, and may be capable of both detecting and filtering unwanted and/or potentially malicious traffic at carrier-class rates. Firewall 135 may include a high speed database using content addressable memory (CAM) technology for state table(s) storage. Firewall 135 may also utilize a Firewall Control Protocol (FCP) to update the state table(s) in firewall 135. Firewall 135 may further utilize packet logic manipulation that may be updated on the CAM state table(s).

Although FIG. 1 shows SIP proxy 130 as part of server 120, in other implementations, SIP proxy 130 may be a separate server entity that includes a device that facilitates the establishment of SIP calls, e.g., as described in RFC 2543. Furthermore, although FIG. 1 shows firewall 135 as part of server 120, in other implementations, firewall 135 may be a separate entity that includes a device which may be configured to permit, deny, and/or proxy data connections set and configured to prevent unwanted and/or potentially malicious traffic from entering and/or leaving the trusted zone. In still other implementations, firewall 135 may perform some or all of the functions the functions of SIP proxy 130, or SIP proxy 130 may perform some or all of the functions of firewall 135.

Although implementations are described below in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP are examples of protocols that may be used for establishing a communications session among terminals, such as clients 110, connected to a network. Although SIP-type messages are shown for convenience, any type of protocol or a mixture of such protocols may be applied in various parts of the overall system.

Furthermore, in one implementation, firewall 135 may include the features set forth in co-pending application Ser. No. 11/557,703, entitled "SYSTEMS AND METHODS FOR IMPLEMENTING A PROTOCOL-AWARE NETWORK FIREWALL," filed on Nov. 8, 2006, the disclosure of which is incorporated by reference herein in its entirety. In another implementation, firewall 135 may include the features set forth in co-pending application Ser. No. 11/557,740, entitled "PREVENTION OF DENIAL OF SERVICE (DoS) ATTACKS ON SESSION INITIATION PROTOCOL (SIP)-BASED SYSTEMS USING RETURN ROUTABILITY CHECK FILTERING," filed on Nov. 8, 2006, the disclosure of which is incorporated by reference herein in its entirety. In still another implementation, firewall 135 may include the features set forth in co-pending application Ser. No. 11/557,739, entitled "PREVENTION OF DENIAL OF SERVICE (DoS) ATTACKS ON SESSION INITIATION PROTOCOL (SIP)-BASED SYSTEMS USING METHOD VULNERABILITY FILTERING," filed on Nov. 8, 2006, the disclosure of which is incorporated by reference herein in its entirety.

Figure 2:
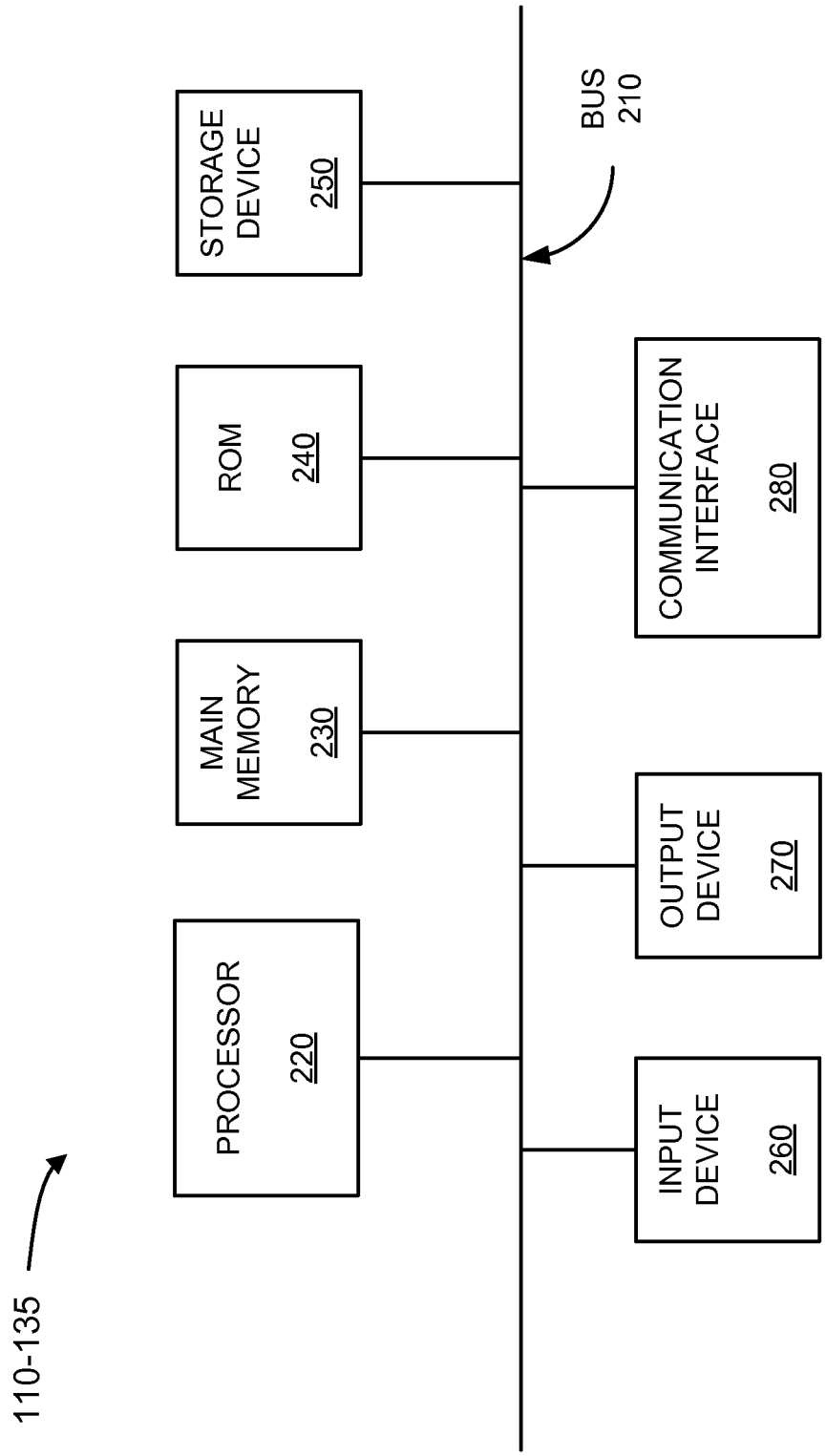
FIG. 2 depicts an exemplary device, client or server, configured to communicate via the exemplary network illustrated in FIG. 1.

FIG. 2 is an exemplary diagram of a client or server entity (hereinafter called "client/server entity"), which may correspond to one or more of clients 110, server 120, SIP proxy 130, and/or firewall 135. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain testing, analysis, and validation operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
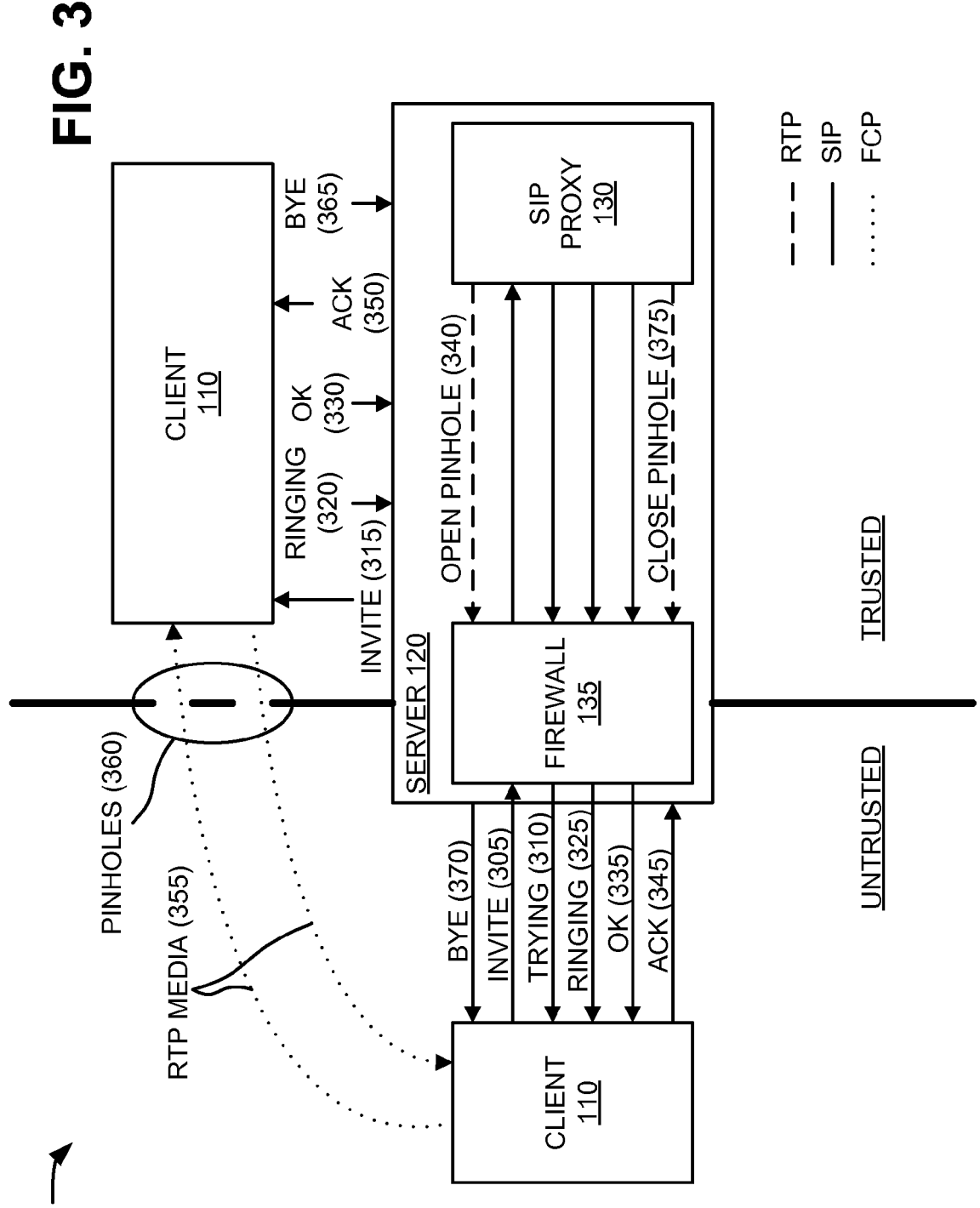
FIG. 3 depicts an exemplary SIP and Firewall Control Protocol (FCP) call flow diagram utilizing the exemplary network illustrated in FIG. 1.

FIG. 3 depicts an exemplary SIP and Firewall Control Protocol (FCP) call flow diagram 300 utilizing the components of network 100. As shown, server 120, SIP proxy 130, and firewall 135 may be provided at a perimeter of a trusted zone and may provide perimeter protection for a trusted client 110 (i.e., client 110 located to the right in FIG. 3). An untrusted client 110 (i.e., client 110 located to the left in FIG. 3) may send an INVITE request 305 to trusted client 110 through server 120. Server 120 may intercept INVITE request 305. SIP proxy 130 may return a TRYING message 310 to untrusted client 110, may fetch a media IP address and a port number from a Session Description Protocol (SDP) body, and may forward an INVITE request 315 to trusted client 110. Trusted client 110 may respond with a RINGING message 320 if the call is not yet established, and firewall 135 and SIP proxy 130 may send a RINGING message 325 to untrusted client 110.

As further shown in FIG. 3, if a call is established, trusted client 110 may send an OK message 330 (which may contain a media IP address and port number in the SDP body) to server 120, and firewall 135 and SIP proxy 130 may send an OK message 335 to untrusted client 110. SIP proxy 130 may fetch trusted client's 110 media IP address and port number, may update a state table, and may send an open pinhole FCP command 340 to firewall 135. Untrusted client 110 may send an ACK message 345 to server 120, and server 120 may send an ACK message 350 to trusted client 110. Firewall 135 may update a CAM database with open pinholes 360 and Real-time Transport Protocol (RTP) media streams 355 may be allowed to flow through pinholes 360 in firewall 135. The line provided between the untrusted and trusted zones in FIG. 3 may correspond to firewall 135. If trusted client 110 wishes to terminate the session, trusted client 110 may send a BYE message 365 to server 120, and server 120 may send a BYE message 370 to untrusted client 110. SIP proxy 130 may remove the session from its state table, and may send a close pinhole FCP command 375 to firewall 135. Firewall 135 may remove the connection from the CAM database, which may close pinholes 360.

Figure 4:
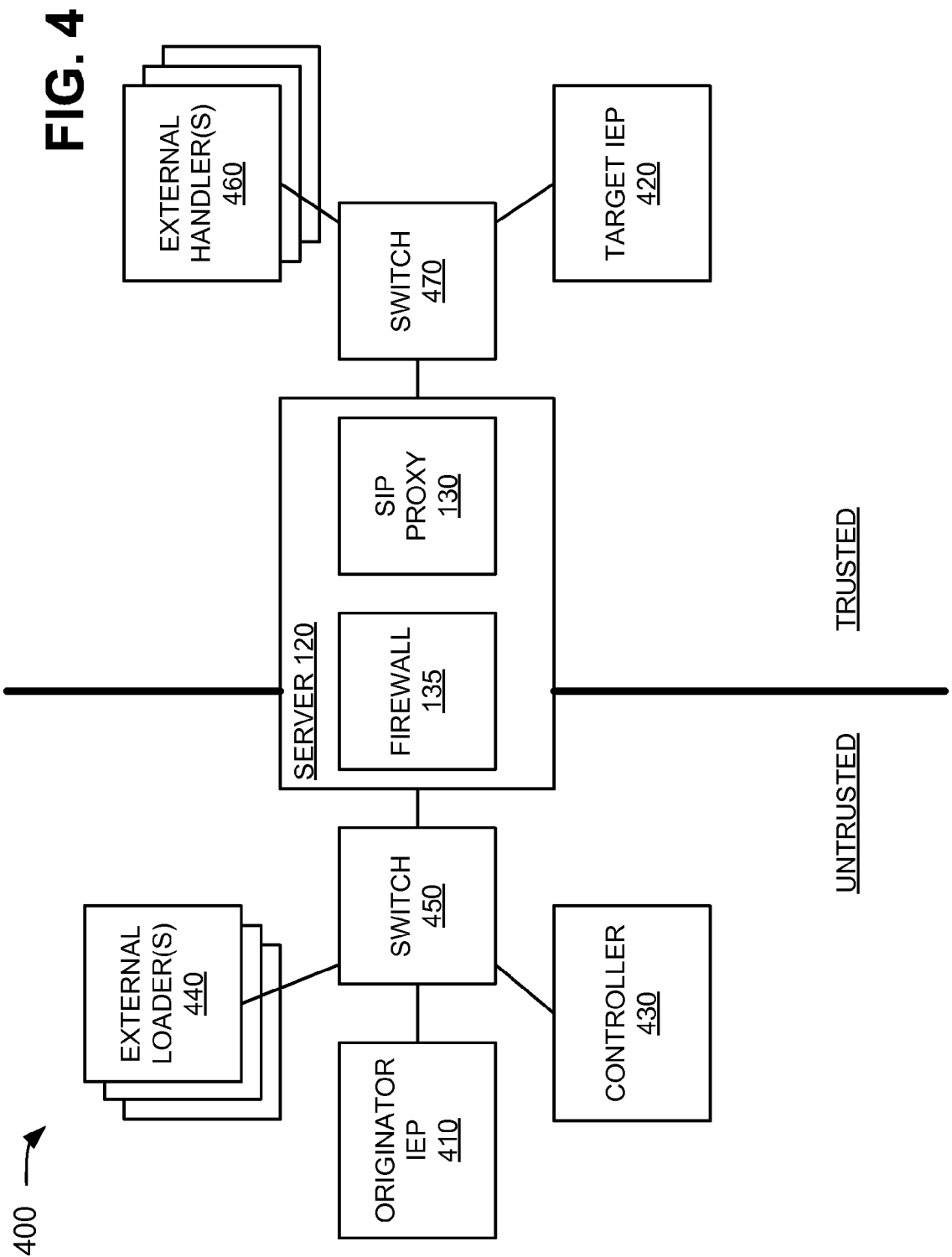
FIG. 4 depicts an exemplary system for testing a firewall and a SIP proxy of an exemplary server illustrated in FIG. 1.

FIG. 4 depicts an exemplary system 400 for testing firewall 135 and SIP proxy 130 of server 120. In one example, firewall/SIP proxy testing system 400 may verify the proper functioning of a dynamically allocating pinhole implementation (e.g., firewall 135 and/or SIP proxy 130), and its scalability and performance at carrier-scale traffic rates. Stateful packet filtering may consume both memory and processor (e.g., central processor unit (CPU) resources. The CPU usage may have a direct impact on the speed of pinhole opening and closing since a full connection state table traversal may be implemented for every arriving RTP packet. As the number of concurrent calls or incoming call rates rises, the CPU may get overloaded. An overloaded CPU may delay signal processing, and SIP BYE messages may be missed, which may cause pinhole closing delays. Such pinhole closing delays may increase until a point when the CPU can no longer handle any new calls. Thus, determination of opening and closing delays may aid measurement of a firewall's operation efficiency. These delays may be measured as a function of the call rate and the number of concurrent calls.

As shown in FIG. 4, firewall/SIP proxy testing system 400 may test the operation of server 120 (with SIP proxy 130 and firewall 135), which may be provided at the intersection of an untrusted zone and a trusted zone. For example, firewall/SIP proxy testing system 400 may perform testing in a controlled IP telephony test bed that may include several SIP user agent (UAs) generating VoIP calls that traverse firewall 135. SIP proxy 130 may route the signaling traffic between the UAs.

Firewall/SIP proxy testing system 400 may include an originator Integrated End Point (IEP) 410, a target IEP 420, a controller 430, one or more external loaders 440, a switch 450, one or more external handlers 460, and a switch 470. Although FIG. 4 shows exemplary components of firewall/SIP proxy testing system 400, in other implementations firewall/SIP proxy testing system 400 may contain fewer or additional components that may permit testing, analysis, and validation of a large scale SIP-aware application layer network perimeter protection device (e.g., firewall 135). In still other implementations, one or more components of firewall/SIP proxy testing system 400 may perform the tasks performed by other components of firewall/SIP proxy testing system 400. For example, originator IEP 410, controller 430, external loaders 440, and switch 450 may be implemented as single device in some embodiments, and/or target IEP 420, external handlers 460, and switch 470 may be implemented as a single device in some embodiments.

Originator IEP 410 may correspond to, for example, one untrusted client 110 shown in FIG. 1, and may include the functionality of one untrusted client 110. Target IEP 420 may correspond to, for example, trusted client 110 shown in FIG. 1, and may include the functionality of trusted client 110. In one implementation, originator IEP 410 and/or target IEP 420 may correspond to a device other than a client device, such as a server device. Originator IEP 410 and target IEP 420 may incorporate traffic generation and analysis tools (e.g., VoIP traffic generation for both SIP signaling and RTP media, scanning probes, a protocol analyzer, a promiscuous mode packet analyzer (e.g., reading packet headers at port level), timing and synchronization with an external clock, etc.). The traffic generation components of originator IEP 410 and target IEP 420 may generate signaling and may correlate media traffic for simulating VoIP calls. Originator IEP 410 may also include an "nmap" port scanner used for scanning probes, whereas target IEP 420 may include a "snort" protocol analyzer. Originator IEP 410 may be used as a traffic injection tool, and target IEP 420 may be used as a traffic analyzer tool.

Controller 430 may be provided in either the untrusted zone or the trusted zone (although FIG. 4 shows controller 430 being provided in the untrusted zone). In one implementation, controller 430 may correspond to one client 110 shown in FIG. 1, and may include the functionality of one client 110. In another implementation, controller 430 may correspond to a device other than a client device, such as a server device. Controller 430 may use Secure Shell (SSH) (e.g., a set of standards and an associated network protocol that may permit establishment of a secure channel between a local and a remote computer) as a control channel, and may coordinate the execution of the testing performed by firewall/SIP proxy testing system 400.

As shown in FIG. 4, one or more external loaders 440 may be provide in the untrusted zone, and one or more external handlers 460 may be provided in the trusted zone. In one implementation, each external loader 440 may correspond to one or more untrusted clients 110 shown in FIG. 1, and may include the functionality of one or more untrusted clients 110. Moreover, each external handler 460 may correspond to one or more untrusted clients 110 shown in FIG. 1, and may include the functionality of one or more untrusted clients 110. In still another implementation, each external loader 440 and/or external handler 460 may correspond to one or more devices other than a client device, such as a server device. External loaders 440 may generate VoIP calls in the untrusted zone that may traverse firewall 135 for load generation purposes. External handlers 460 may handle, in the trusted zone, the VoIP calls generated by external loaders 440.

Originator IEP 410, controller 430, and external loaders 440 may connect to server 120 via switch 450. Target IEP 420 and external handlers 460 may connect to server 120 via switch 470. Switches 450 and 470 may include a data transfer device, such as a gateway, a router, a switch, a firewall, a bridge, a proxy server, or some other type of device that processes and/or transfers data.

Firewall/SIP proxy testing system 400 may perform three types of testing on firewall 135 and/or SIP proxy 130: (1) verification that only signaled pinholes are open; (2) measurement of pinhole opening and closing delays; and (3) measurements under load conditions. Detailed descriptions of each type of testing performed by firewall/SIP proxy testing system 400 are provided below.

During verification that only signaled pinholes are open, firewall/SIP proxy testing system 400 may launch traffic from an originating end (e.g., from originator IEP 410), and may verify what traffic traversed firewall 135 and can be detected at a target end (e.g., at target IEP 420). Firewall 135 may be probed for compliance with basic static rules regarding accepted originating and destination IP addresses. To verify that the dynamic rule-sets are operating correctly, firewall/SIP proxy testing system 400 (e.g., controller 430) may cause originator IEP 410 to launch a scanning tool from an IP address not associated with a current call. If firewall 135 is operating correctly, firewall 135 may close all ports to data from the IP address not associated with the current call. In other words, if firewall 135 is operating correctly, the scanning probe capability may not be detected across firewall by target IEP 420 and such traffic may be blocked by firewall 135 at the IP address level.

To verify that the ports of firewall 135 that are not defined within the firewall rule-set, and hence not currently dynamically allocated, are closed, firewall/SIP proxy testing system 400 (e.g., controller 430) may cause originator IEP 410 to generate traffic across User Datagram Protocol (UDP) and Transmission Control Protocol (TCP) port ranges from a legitimate IP address, and may cause target IEP 420 to monitor this traffic. Firewall/SIP proxy testing system 400 may use originator IEP 420 to launch calls associated with a pair of legitimately opened pinholes. Firewall/SIP proxy testing system 400 (e.g., controller 430) may cause the scanning probe component of originator IEP 410 to be launched from the same legitimate IP address, and to probe the UDP and TCP port ranges for the legitimate originating IP address. Firewall/SIP proxy testing system 400 (e.g., controller 430) may cause target IEP 420 to analyze the arriving traffic and to discriminate between allowed traffic per firewall 135 rules and traffic addressed to ports other than the legitimate dynamic ports. If firewall 135 is operating correctly, no traffic other than traffic addressed to dynamically allowed ports may appear at target IED 420. The presence of ports other than those dynamically allocated may indicate a failure in firewall 135.

Measurement of pinhole opening and closing delays by firewall/SIP proxy testing system 400 may verify two areas. First, firewall/SIP proxy testing system 400 may verify a speed with which firewall 135 correlates information from INVITE or OK messages with the opening of the pinhole, i.e., the pinhole opening delay. Pinhole opening delay may measure the ability of firewall 135 to prevent blocking the beginning of audio conversations. Second, firewall/SIP proxy testing system 400 may verify a length of time a pinhole remains open after a call has effectively terminated, i.e., the pinhole closing delay. The pinhole closing delay may be defined by the time a last RTP packet sent from originator IEP 410 is detected by target IEP 420. The pinhole closing delay helps to characterize firewall 135 in terms of its commitment to provide absolute security.

Firewall/SIP proxy testing system 400 (e.g., controller 430) may measure the pinhole opening and closing delays of firewall 135 by manipulating an RTP sequence number and marker bit header fields, and by monitoring packets received by originator IEP 410 and target IEP 420. To determine the pinhole opening delay of firewall 135, firewall/SIP proxy testing system 400 (e.g., controller 430) may cause originator IEP 410 to start the RTP media stream with a zero sequence number. RTP packets may be sent with sequentially increasing sequence numbers at a predetermined time interval (e.g., every twenty milliseconds). Firewall/SIP proxy testing system 400 (e.g., controller 430) may cause target IEP 420 to use a first recorded RTP sequence number as an indicator of the number of packets that were dropped by firewall 135 before the pinhole was opened. Firewall/SIP proxy testing system 400 (e.g., controller 430) may calculate the pinhole opening delay by multiplying the number of dropped packets by the predetermined time interval.

Firewall/SIP proxy testing system 400 (e.g., controller 430) may determine the pinhole closing delay of firewall 135 by causing originator IEP 410 to continue the RTP stream after originator IEP 410 sends a BYE message to target IEP 420. Firewall/SIP proxy testing system 400 (e.g., controller 430) may cause originator IEP 410 to set a marker bit in RTP packets that are sent after the BYE message for a predetermined time interval (e.g., every ten milliseconds). Some RTP packets may traverse firewall 135 while the BYE message is processed and until the pinhole is actually closed. The set marker bit may distinguish the RTP packets which traversed firewall 135 after the BYE message from other RTP packets. Firewall/SIP proxy testing system 400 (e.g., controller 430) may count the number of RTP packets having the marker bit set. Firewall/SIP proxy testing system 400 (e.g., controller 430) may calculate the pinhole closing delay of firewall 135 by multiplying the number of RTP packets having the marker bit set by the predetermined time interval. For finer granularity measurement firewall/SIP proxy testing system 400 (e.g., controller 430) may cause originator IEP 410 to send such "post BYE message" RTP packets at a shorter predetermined time interval (e.g., less then ten milliseconds).

Utilization of short predetermined time intervals for calculating pinhole opening and closing delays may enable firewall/SIP proxy testing system 400 to determine such delays with finer granularity. This may enhance verification and qualification of firewall 135, which may ensure reliability.

Measurements under load by firewall/SIP proxy testing system 400 may entail measuring pinhole opening and closing delays while firewall 135 is loaded. Firewall/SIP proxy testing system 400 (e.g., controller 430) may cause external loaders 440 to generate an external load on firewall 135 before an internal load is generated for pinhole opening and closing delay measurements. Firewall/SIP proxy testing system 400 (e.g., controller 430) may read an input benchmark configuration file that may specify user names of external loaders 440 and external handlers 460; an IP address of SIP proxy 130; IP addresses of external loaders 440, external handlers 460, originator IEP 410, and target IEP 420; a calls per second rate; a total number of calls to generate; etc. Firewall/SIP proxy testing system 400 (e.g., controller 430) may establish a configurable number of concurrent calls that may be handled by firewall 135. If the load is established, firewall/SIP proxy testing system 400 (e.g., controller 430) may invoke originator IEP 410 and target IEP 420 for measuring the pinhole opening and closing delays. The originator IEP 410 and target IEP 420 may create and destroy calls at the configured call rate. If the pinhole opening and closing delay measurements are completed, firewall/SIP proxy testing system 400 (e.g., controller 430) may tear down established calls and may analyzes outputs of originator IEP 410 and target IEP 420.

External loaders 440 and external handlers 460 may provide a distributed processing environment to accomplish external loading of firewall 135. Such an environment may enable firewall/SIP proxy testing system 400 to provide various external load conditions for firewall 135.

The following example illustrates operation of the above firewall/SIP proxy testing system 400. In this example, assume firewall/SIP proxy testing system 400 (e.g., controller 430) may cause a single external loader 440 and a single external handler 460 to generate "6,000" concurrent calls. Further assume that each call may include two RTP streams, and that each RTP stream may include a "160" byte RTP packet payload. It is also assumed that as firewall 135 is loaded, signaling processing may be delayed and RTP packets may be sent further and further apart. As a result, at some point no more new calls may be established and a total generated bandwidth may be limited to about forty megabytes per second. Five pairs of external loaders 440 and external handlers 460 may generate up to "30,000" concurrent calls, i.e., "30,000" RTP streams in each direction. As a result, originator IEP 410 and target IEP 420 may not generate more than "300" calls per second since higher call rates introduced an increasing delay in the predetermined time interval, which may be used for pinhole opening and closing delay measurements.

Table 1 shows the exemplary results obtained from the above exemplary conditions. Table 1 does not show the results of measurements taken with lower calls per second rates since they all showed zero pinhole opening and closing delays.

TABLE 1

Pinhole opening and closing delay test results

| Concurrent Calls | Calls Per Second | Opening Delay (ms) | Closing Delay (ms) |
|---|---|---|---|
| 10,000 | 300 | 15 | 0 |
| 15,000 | 300 | 14.8 | 0 |
| 20,000 | 300 | 15 | 0 |
| 25,000 | 300 | 15 | 0 |
| 30,000 | 300 | 15.4 | 3.4 |

The results of Table 1 show substantially flawless behavior of SIP-aware firewall 135 under the exemplary conditions. The opening delays may be negligible, i.e., an average of less than one RTP packet was dropped before the pinhole was opened. Some minor closing delays were detected when "30,000" concurrent calls were established.

Figure 5:
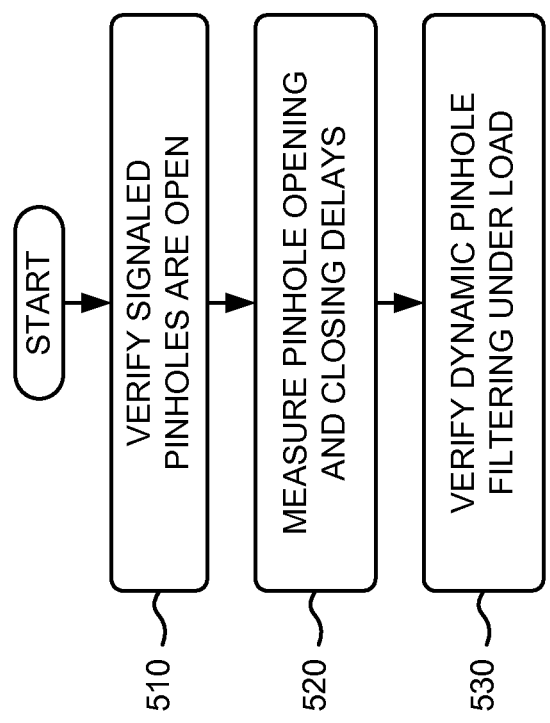
FIGS. 5-8 are flowcharts of exemplary processes according to implementations described herein.

FIGS. 5-8 are flowcharts of exemplary processes capable of being performed by controller 430, firewall/SIP proxy testing system 400, or combinations of devices of firewall/SIP proxy testing system 400. As shown in FIG. 5, a process 500 may verify that signaled pinholes created by a firewall are open (block 510). For example, in one implementation described above in connection with FIG. 4, firewall/SIP proxy testing system 400 may verify that only signaled pinholes are open in firewall 135.

Process 500 may measure pinhole opening and closing delays of the firewall (block 520). For example, in one implementation described above in connection with FIG. 4, firewall/SIP proxy testing system 400 may measure pinhole opening and closing delays occurring in firewall 135.

As further shown in FIG. 5, process 500 may verify dynamic pinhole filtering under load conditions (block 530). For example, in one implementation described above in connection with FIG. 4, firewall/SIP proxy testing system 400 may measure pinhole opening and closing delays occurring in firewall 135 under load conditions.

Figure 6:
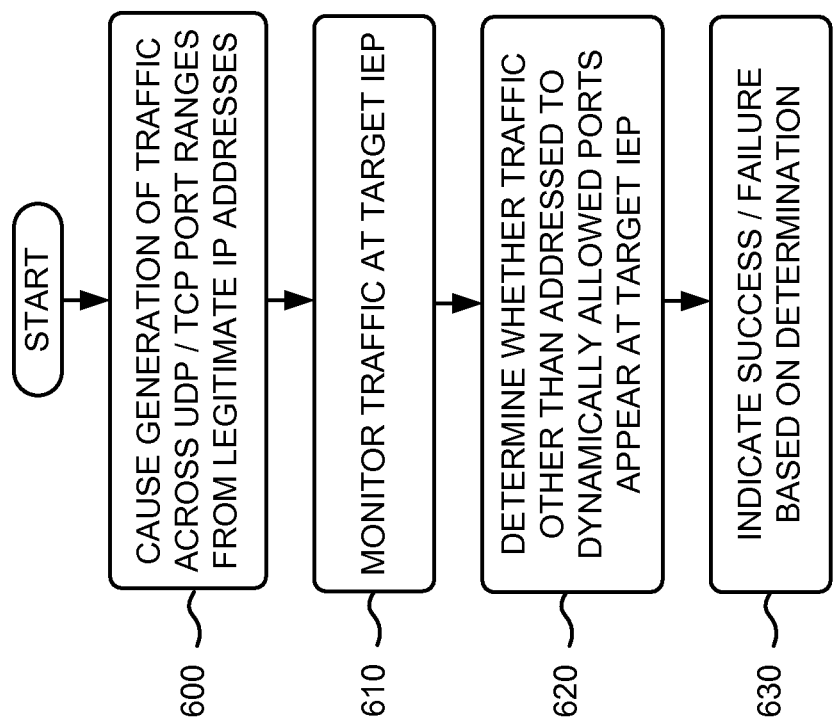

FIG. 6 shows the process blocks related to process block 510 of process 500. As shown, process block 510 may cause the generation of traffic across UDP and TCP port ranges from legitimate IP addresses (block 600). For example, in one implementation described above in connection with FIG. 4, to verify that the ports of firewall 135 that are not defined within the firewall rule-set, and hence not currently dynamically allocated, are closed, firewall/SIP proxy testing system 400 (e.g., controller 430) may cause originator IEP 410 to generate traffic across UDP and TCP port ranges from a legitimate IP address.

Process block 510 may monitor the traffic at a target integrated end point (IEP) (block 610). For example, in one implementation described above in connection with FIG. 4, firewall/SIP proxy testing system 400 may cause target IEP 420 to monitor traffic generated across UDP and TCP port ranges from legitimate IP addresses.

As further shown in FIG. 6, process block 510 may determine whether traffic other than addressed to dynamically allowed ports appear at the target IEP (block 620). For example, in one implementation described above in connection with FIG. 4, firewall/SIP proxy testing system 400 (e.g., controller 430) may cause the scanning probe component of originator IEP 410 to be launched from the same legitimate IP address, and to probe the UDP and TCP port ranges for the legitimate originating IP address. Firewall/SIP proxy testing system 400 (e.g., controller 430) may cause target IEP 420 to analyze the arriving traffic and to discriminate between allowed traffic per firewall 135 rules and traffic addressed to ports other than the legitimate dynamic ports.

Process block 510 may indicate a success or failure of the firewall based on the determination of whether traffic other than addressed to dynamically allowed ports appear at the target IEP (block 630). For example, in one implementation described above in connection with FIG. 4, if firewall 135 is operating correctly, no traffic other than traffic addressed to dynamically allowed ports may appear at target IED 420. The presence of ports other than those dynamically allocated may indicate a failure in firewall 135.

Figure 7A:
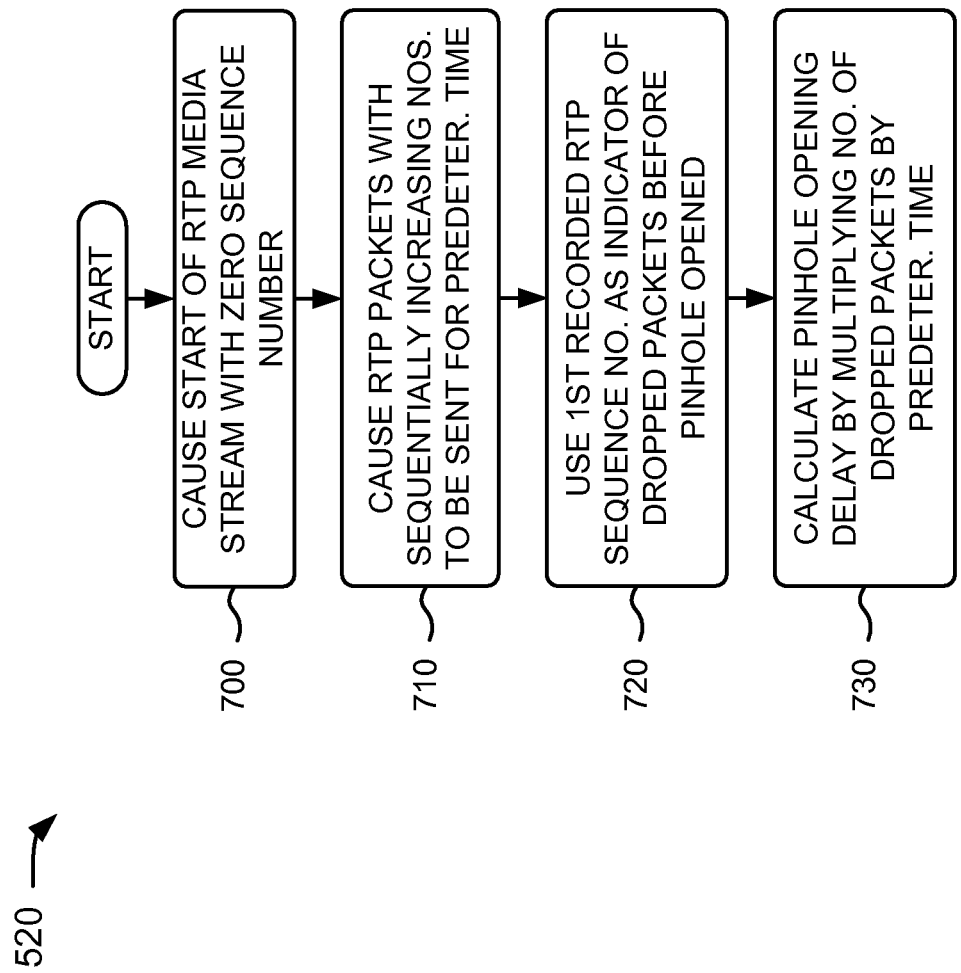
Figure 7B:
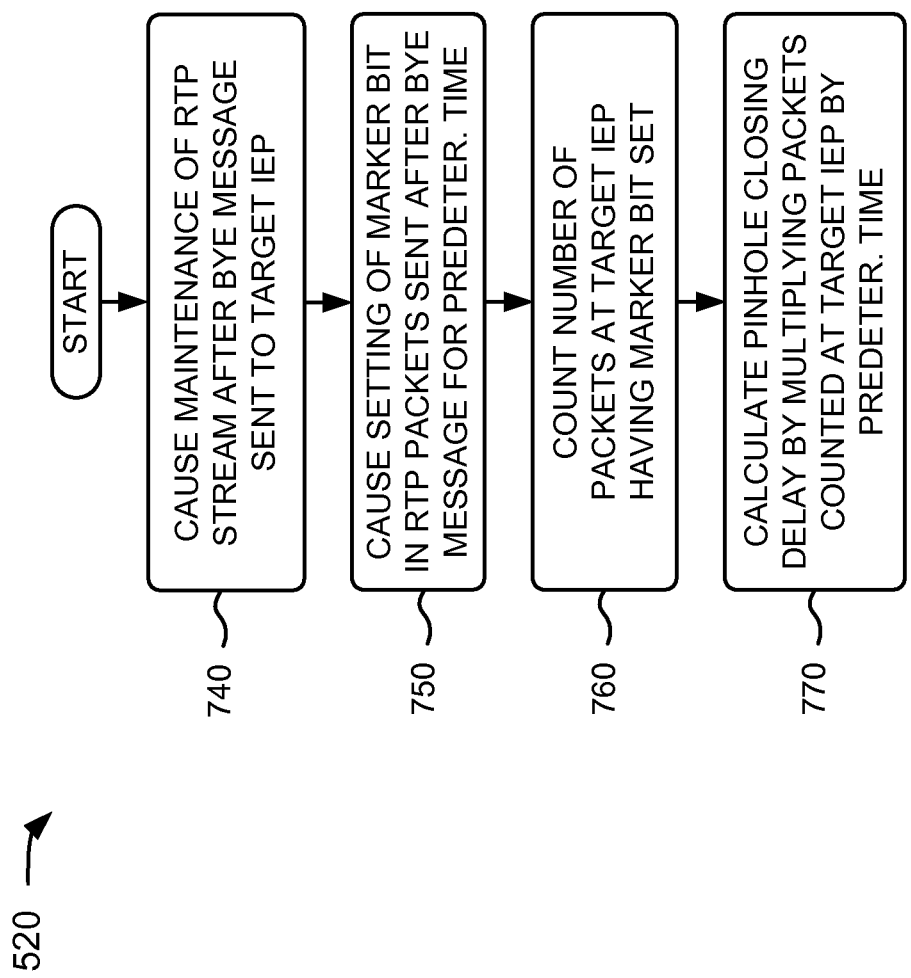

FIGS. 7A and 7B depict process blocks related to process block 520 of process 500. FIG. 7A may relate generally to a process for determining pinhole opening delays, and FIG. 7B may relate generally to a process for determining pinhole closing delays. As shown in FIG. 7A, process block 520 may cause the start of an RTP media stream with a zero sequence number (block 700). For example, in one implementation described above in connection with FIG. 4, to determine the pinhole opening delay of firewall 135, firewall/SIP proxy testing system 400 (e.g., controller 430) may cause originator IEP 410 to start the RTP media stream with a zero sequence number.

Process block 520 may cause RTP packets with sequentially increasing numbers to be sent for a predetermined time interval (block 710). For example, in one implementation described above in connection with FIG. 4, firewall/SIP proxy testing system 400 may cause RTP packets to be sent with sequentially increasing sequence numbers at a predetermined time interval (e.g., every twenty milliseconds).

As further shown in FIG. 7A, process block 520 may use a first recorded RTP sequence number as an indicator of dropped packets before the pinhole opened (block 720). For example, in one implementation described above in connection with FIG. 4, firewall/SIP proxy testing system 400 (e.g., controller 430) may cause target IEP 420 to use a first recorded RTP sequence number as an indicator of the number of packets that were dropped by firewall 135 before the pinhole was opened.

Process block 520 may calculate the pinhole opening by multiplying the number of dropped packets by the predetermined time interval (block 730). For example, in one implementation described above in connection with FIG. 4, firewall/SIP proxy testing system 400 (e.g., controller 430) may calculate the pinhole opening delay by multiplying the number of dropped packets by the predetermined time interval.

As shown in FIG. 7B, process block 520 may cause maintenance of the RTP stream after a BYE message is sent to the target IEP (block 740). For example, in one implementation described above in connection with FIG. 4, firewall/SIP proxy testing system 400 (e.g., controller 430) may determine the pinhole closing delay of firewall 135 by causing originator IEP 410 to continue the RTP stream after originator IEP 410 sends a BYE message to target IEP 420.

Process block 520 may cause setting of a marker bit in RTP packets sent after the BYE message was sent to the target IEP for a predetermined time interval (block 750). For example, in one implementation described above in connection with FIG. 4, firewall/SIP proxy testing system 400 (e.g., controller 430) may cause originator IEP 410 to set a marker bit in RTP packets that are sent after the BYE message for a predetermined time interval (e.g., every ten milliseconds). Some RTP packets may traverse firewall 135 while the BYE message is processed and until the pinhole is actually closed. The set marker bit may distinguish the RTP packets which traversed firewall 135 after the BYE message from other RTP packets.

As further shown in FIG. 7B, process block 520 may count the number of packets at the target IEP that have the marker bit set (block 760). For example, in one implementation described above in connection with FIG. 4, firewall/SIP proxy testing system 400 (e.g., controller 430) may count the number of RTP packets having the marker bit set.

Process block 520 may calculate the pinhole closing delay by multiplying the number of RTP packets counted at the target IEP by the predetermined time interval (block 770). For example, in one implementation described above in connection with FIG. 4, firewall/SIP proxy testing system 400 (e.g., controller 430) may calculate the pinhole closing delay of firewall 135 by multiplying the number of RTP packets having the marker bit set by the predetermined time interval. For finer granularity measurement firewall/SIP proxy testing system 400 (e.g., controller 430) may cause originator IEP 410 to send such "post BYE message" RTP packets at a shorter predetermined time interval (e.g., less then ten milliseconds).

Figure 8:
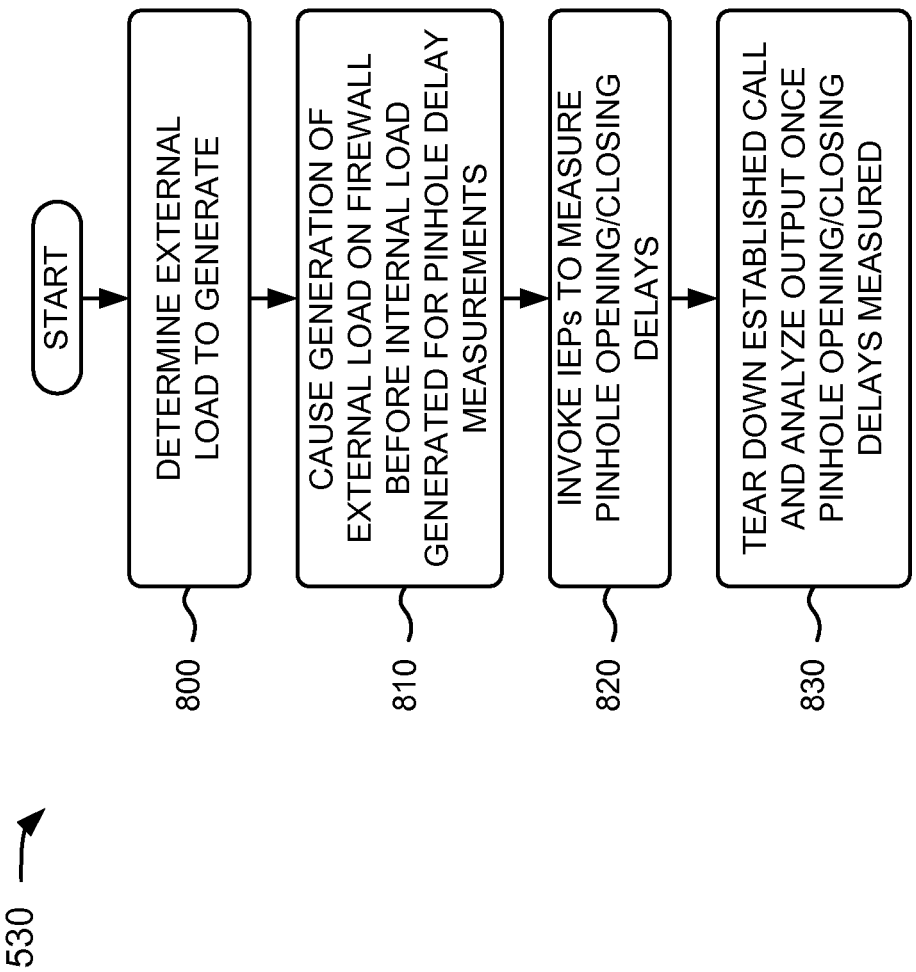

FIG. 8 depicts process blocks related to process block 530 of process 500. As shown, process block 530 may determined an external load to generate (block 800). For example, in one implementation described above in connection with FIG. 4, measurements under load by firewall/SIP proxy testing system 400 may entail measuring pinhole opening and closing delays while firewall 135 is loaded. Firewall/SIP proxy testing system 400 (e.g., controller 430) may determine the external load to generate on firewall 135 before an internal load is generated for pinhole opening and closing delay measurements.

Process block 530 may cause generation of the external load on the firewall before an internal load is generated for pinhole opening and closing delay measurements (block 810). For example, in one implementation described above in connection with FIG. 4, measurements under load by firewall/SIP proxy testing system 400 (e.g., controller 430) may cause external loaders 440 to generate an external load on firewall 135 before an internal load is generated for pinhole opening and closing delay measurements. Firewall/SIP proxy testing system 400 (e.g., controller 430) may read an input benchmark configuration file that may specify user names of external loaders 440 and external handlers 460; an IP address of SIP proxy 130; IP addresses of external loaders 440, external handlers, originator IEP 410, and target IEP 420; a calls per second rate; a total number of calls to generate; etc. Firewall/SIP proxy testing system 400 (e.g., controller 430) may establish a configurable number of concurrent calls that may be handled by firewall 135.

As further shown in FIG. 8, process block 530 may invoke the originator IEP and the target IEP to calculate the pinhole opening and closing delays (block 820). For example, in one implementation described above in connection with FIG. 4, if the load is established, firewall/SIP proxy testing system 400 (e.g., controller 430) may invoke originator IEP 410 and target IEP 420 for measuring the pinhole opening and closing delays. The originator IEP 410 and target IEP 420 may create and destroy calls at the configured call rate.

Process block 530 may tear down established calls and may analyze outputs of the originator IEP and the target IEP once the pinhole opening and closing delays are calculated (block 830). For example, in one implementation described above in connection with FIG. 4, if the pinhole opening and closing delay measurements are completed, firewall/SIP proxy testing system 400 (e.g., controller 430) may tear down established calls and may analyzes outputs of originator IEP 410 and target IEP 420.

Systems and methods described herein may test, analyze, and validate a large scale SIP-aware application layer network perimeter protection device (e.g., a firewall). For example, the systems and methods may verify that the SIP-aware firewall rule sets are properly filtering traffic based on source and destination IP addresses, port numbers, and/or the protocol being used. Thus, the SIP-aware firewall may be closed to all ports except those ports allowed by signaling. The systems and methods may also use finer granularity measurements of pinhole opening and closing delays of the SIP-aware firewall. This may entail quantification of vulnerabilities of the SIP-aware firewall through statistical measurements as pinholes are opened and closed. The systems and methods may further generate VoIP load traffic for the SIP-aware firewall to test and analyze performance of the SIP-aware firewall under load conditions.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 5-8, the order of the acts may differ in other implementations. Further, non-dependent acts may be performed in parallel.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   sending a stream of packets for passing through a pinhole in a network perimeter protection device,
   wherein the pinhole passes packets for a session created by a session control protocol,
   wherein each packet in the stream includes an indication of a position of the packet in the stream relative to a start of the stream and wherein at least one packet of the stream of packets is dropped by the network perimeter device, and
   wherein the packets in the stream are sent at known time intervals;
   receiving one or more packets in the stream including a first packet received first in time, wherein the one or more packets passed through the pinhole; and
   calculating a pinhole opening delay based on the indication of the position of the first received packet and the known time intervals, wherein the indication of the position of the first received packet indicates that the first received packet was sent subsequent to sending the at least one packet dropped by the network perimeter device.

2. The method of claim 1, further comprising:
   causing generation of an external load on the network perimeter protection device prior to calculating the pinhole opening delay; and
   wherein calculating the pinhole opening delay includes calculating the pinhole opening delay without reference to the indication of the position of the at least one packet dropped by the network perimeter device.

3. The method of claim 1, further comprising:
   causing generation of traffic across a range of ports from a legitimate network address, wherein the traffic is generated on a first side of the network perimeter protection device;
   monitoring traffic at a target end point on a second side of the network perimeter protection device;
   determining whether traffic other than traffic addressed to dynamically allowed ports appear at the target end point; and
   indicating one of a success or a failure of the network perimeter protection device based on the determining.

4. The method of claim 1,
   wherein sending the stream of packets includes:
      initiating a Real-time Transport Protocol (RTP) stream with an initial sequence number after the transmission of a session control message identifying an Internet Protocol (IP) address and a port number of a device in a trusted network for the session;
      causing RTP packets with changing sequence numbers to be sent at the known time intervals, wherein the indication of the position of the packet in the stream includes the sequence number; and
   wherein calculating the pinhole opening delay includes:
      calculating the pinhole opening delay based on the sequence number of the first received packet and the known time intervals without reference to a time the session control message identifying the IP address and port number was sent.

5. The method of claim 1, wherein sending the packets at known time intervals includes sending the packets at time intervals less than or equal to twenty milliseconds, the method further comprising updating a content-addressable memory (CAM) with information defining the pinhole in response to the session control protocol creating the session, wherein the network perimeter protection device includes the CAM and drops packets based on information stored in the CAM.

6. The method of claim 1, further comprising:
   sending or maintaining a second stream of packets after a session termination message is sent to end the session associated with the pinhole;
   wherein the packets in the second stream include information indicating that the sending of the packets after the session termination message has been sent; and
   wherein the packets in the second stream are sent at second known time intervals;
   receiving a number of the packets in the second stream having passed through the pinhole after the sending of the session termination message; and
   determining a pinhole closing delay based on the number of received packets and the second known time intervals.

7. The method of claim 6, wherein the second known time intervals are less than or equal to ten milliseconds, the method further comprising updating a content-addressable memory (CAM) to remove information defining the pinhole in response to the session termination message, wherein the network perimeter protection device includes the CAM and drops packets based on information stored in the CAM.

8. The method of claim 6, further comprising:
   causing generation of an external load on the network perimeter protection device prior to calculating the pinhole closing delay.

9. The method of claim 1, the method further comprising:
   fetching, by the network perimeter protection device, session information from session control messages, wherein the session information includes an Internet Protocol (IP) address and a port number of a device in a trusted network for the session;
   wherein the pinhole opening delay indicates a speed with which the network perimeter protection device correlates the session information with the pinhole opening,
   wherein calculating the pinhole opening delay includes calculating the pinhole opening delay without reference to a time the session control message identifying the session information was sent.

10. A system comprising:
    one or more testing devices including:
    a transmitter to send a stream of packets for passing through a pinhole in a network perimeter protection device,
       wherein the pinhole passes packets for a session created by a session control protocol, and
       wherein each packet in the stream includes information indicative of a time the corresponding packet is sent relative to the start of the stream of packets and wherein at least one packet in the stream of packets is dropped by the network perimeter device;
    a receiver to receive one or more packets in the stream including a first packet received first in time, wherein the one or more packets passed through the pinhole; and
    a processor to determine a pinhole opening delay based on the information indicative of the time the corresponding packet was sent relative to the start of the stream of packets without information indicative of the time the at least one packet dropped by the network perimeter device was sent relative to the start of the stream of packets, wherein the indication of the time the received one or more packets was sent indicates that the first received packet was sent by the transmitter subsequent to the transmitter sending the at least one packet in the stream of packets dropped by the network perimeter device.

11. The system of claim 10, wherein the one or more testing devices further include a second transmitter, different than the transmitter to send the stream of packets for passing through the pinhole, to generate an external load on the network perimeter protection device prior to determining the pinhole opening delay.

12. The system of claim 10, wherein the network perimeter protection device includes:
   a firewall including a content-addressable memory (CAM), wherein the firewall drops packets based on information stored in the CAM; and
   a Session Initiation Protocol (SIP) proxy including:
      a receiver to receive SIP messages;
      a processor to fetch, from the SIP messages, session information and to instruct the firewall to update the CAM with information to open the pinhole based on the session information,
   wherein the pinhole opening delay indicates a speed with which the firewall correlates the session information with the pinhole opening.

13. The system of claim 10, herein the one or more testing devices further comprise:
   an originator end point; and
   a target end point, wherein the originator end point and target end point generate communications for the one or more testing devices.

14. The system of claim 10,
   wherein the transmitter generates traffic across a range of ports from a legitimate network address;
   wherein the receiver monitors traffic at a target end point;
   wherein the processor is configured to determine whether traffic other than traffic addressed to dynamically allowed ports appear at the target end point; and
   wherein the processor is further configured to indicate one of a success or a failure of the network perimeter protection device based on the determination.

15. The system of claim 10,
   wherein the stream of packets for passing through the pinhole includes Real-time Transport Protocol (RTP) packets transmitted at known time intervals and wherein the information indicative of the position of each packet includes changing sequence numbers;
   wherein the receiver receives one or more of the RTP packets, including a first RTP packet having a first sequence number;
   wherein the processor uses the first sequence number as an indicator of a number of dropped RTP packets before the pinhole was opened; and
   wherein the processor calculates the pinhole opening delay based on the number of dropped RTP packets and the known time intervals.

16. The system of claim 10,
   wherein the transmitter sends or maintains a second stream of packets for passing through the pinhole after a session termination message is sent to end the session corresponding to the pinhole;
      wherein the packets in the second stream include information indicating the sending of the packets after the session termination message is sent;
      wherein the packets in the second stream are sent at second known time intervals;
   wherein the receiver receives a number of packets in the second stream having passed through the pinhole and including the information indicating the sending of the packets after the session termination message was sent; and
   wherein the processor calculates a pinhole closing delay based on the number of packets and the second known time intervals.

17. The system of claim 16,
   wherein a second transmitter, different than the transmitter to send the stream of packets for passing through the pinhole or the transmitter to send the second stream of packets for passing through the pinhole, causes generation of an external load on the network perimeter protection device prior to calculating the pinhole opening and closing delays.

18. A system comprising:
   a transmitter to send a stream of packets for passing through a pinhole in a network perimeter protection device,
      wherein each of the packets in the stream is sent after a session control protocol sends a message to end the session,
      wherein each of the packets in the stream includes information indicating that the packet was sent after the session control protocol sent a message to end the session,
      wherein the packets in the stream are sent at known time intervals;
   a receiver to receive a number of packets in the stream, the number of packets having passed through the pinhole; and
   a processor to determine a pinhole closing delay based on the number of packets having passed through the pinhole and the known time intervals.

19. The system of claim 18, wherein the network perimeter protection device includes:
   a firewall including a content-addressable memory (CAM), wherein the firewall drops packets based on information stored in the CAM;
   a Session Initiation Protocol (SIP) proxy including:
      a receiver to receive SIP messages including the message to end the session,
      a processor to instruct the firewall to update the CAM to close the pinhole corresponding to the message to end the session,
   wherein the pinhole closing delay indicates a length of time the pinhole remains open after the session has ended,
   wherein the processor calculates the pinhole closing delay without reference to a time the session control protocol message was sent to end the session.

20. The system of claim 18, further comprising:
   a second transmitter, different than the transmitter to send the stream of packets for passing through a pinhole, to generate an external load on the network perimeter protection device prior to the processor determining the pinhole closing delay.

21. The system of claim 20, wherein the processor further:
   determines the external load to generate for the network perimeter protection device;
   invokes an originator end point and a target end point to calculate the pinhole closing delay; and
   tears down established sessions and analyzes outputs of the originator and target end points after the pinhole closing delay is calculated.

22. The system of claim 18,
   wherein the transmitter generates traffic across a range of ports from a legitimate network address;

wherein the receiver receives the traffic at a target end point; and wherein the processor determines whether traffic other than traffic addressed to dynamically allowed ports appear at the target end point and indicates one of a success or a failure of the network perimeter protection device based on the determination.

23. The system of claim 18, wherein the transmitter sends a Real-time Transport Protocol (RTP) stream of packets with changing sequence numbers to pass through the pinhole, wherein the packets in the RTP stream are sent at second known time intervals;

wherein the receiver receives one or more of the packets in the stream, wherein the one or more packets passed through the pinhole; and wherein the processor uses a first recorded RTP sequence number as an indicator of a number of dropped RTP packets before the pinhole was opened; and wherein the processor calculates the pinhole opening delay based on the number dropped RTP packets and the second known time intervals.

24. The system of claim 18, wherein the stream of packets includes a Real-time Transport Protocol (RTP) stream and the session termination message includes a BYE message;

wherein the information indicating that the packet was sent after sending the session termination message includes a marker bit set in RTP packets sent after the BYE message;

wherein the processor determines a number of RTP packets including the bit marker having passed through the pinhole; and wherein the processor calculates the pinhole closing delay based on the determined number of RTP packets and the known time intervals.

25. A method comprising:

sending a stream of packets for passing through a pinhole in a network perimeter protection device,
  wherein the pinhole passes packets for a session created by a session control protocol and wherein the session control protocol has sent a message to end the session,
  wherein each of the packets in the stream is sent after the session control protocol has ended the session,
  wherein each of the packets in the stream includes information indicating that the packet was sent after the session control protocol has ended the session,
  wherein each of the packets in the stream is sent at a known time relative to a start of the stream;

receiving a number of packets in the stream, the number of packets having passed through the pinhole; and calculating a pinhole closing delay based on the known time relative to the start of the stream of one of the received packets.

26. The method of claim 25, further comprising:

receiving the session control protocol message to end the session;

sending an instruction to the network perimeter protection device to update a content-addressable memory (CAM) to close the pinhole corresponding to the message to end the session, wherein the pinhole closing delay indicates a length of time the pinhole remains open after the session has ended.

* * * * *